Patented Jan. 19, 1932

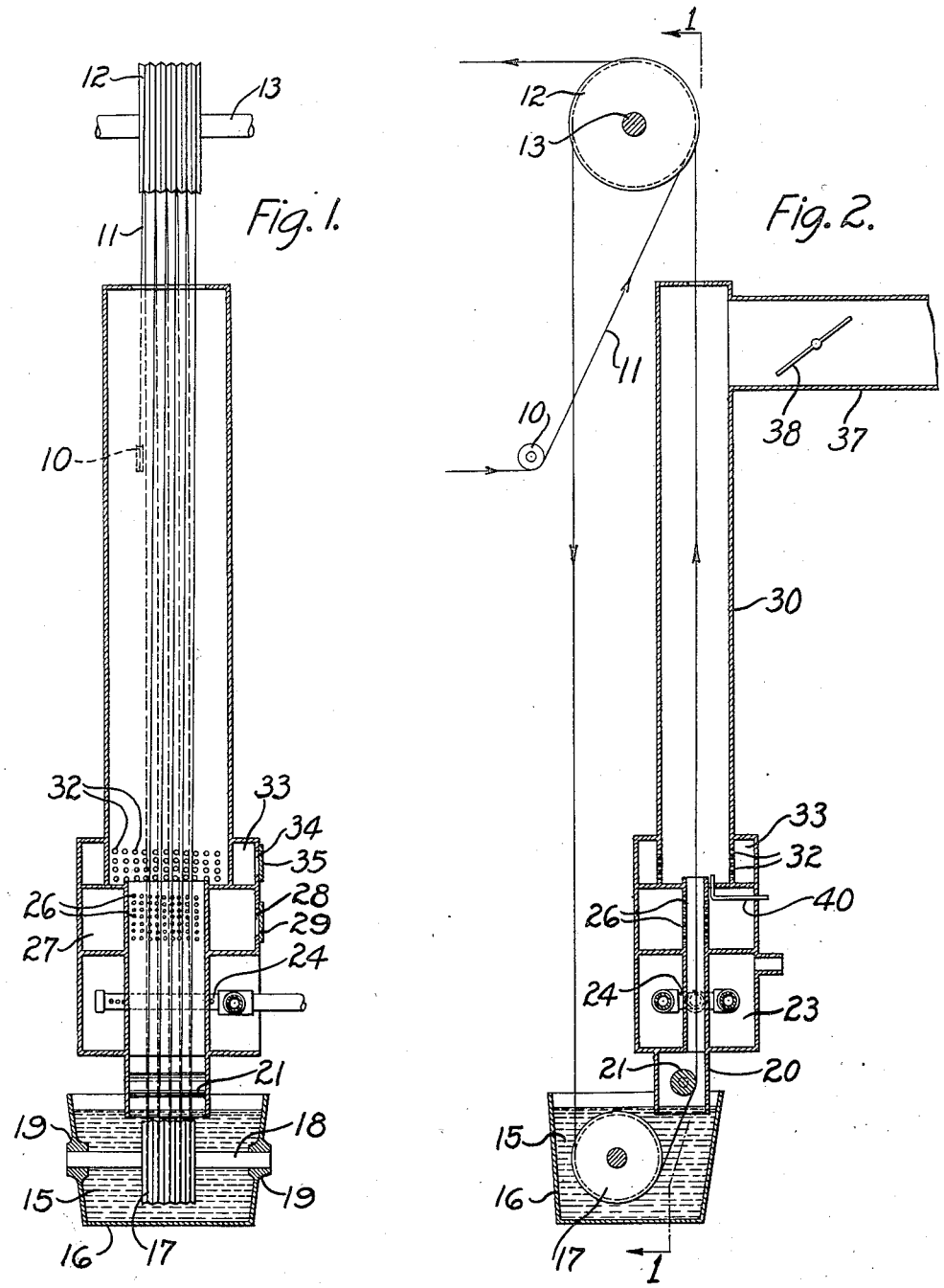

1,841,485

UNITED STATES PATENT OFFICE

HENRY MARTIN LARSEN, OF LA GRANGE, ILLINOIS, ASSIGNOR TO WESTERN ELECTRIC COMPANY, INCORPORATED, OF NEW YORK, N. Y., A CORPORATION OF NEW YORK

APPARATUS FOR TREATING MATERIALS

Original application filed November 30, 1926, Serial No. 151,624. Divided and this application filed September 4, 1928. Serial No. 303,841.

This invention relates to apparatus for treating materials, and more particularly to apparatus for treating material applied to a core in strand form.

This application is a division of my copending application Serial No. 151,624, filed November 30, 1926, for a process of and apparatus for treating materials.

An object of the invention is the provision of a simple and effective apparatus for hardening material applied to a core in strand form.

Another object is the provision of apparatus for treating enamel insulated wire efficiently and with great rapidity, and in consequence at a minimum cost of production.

A further object of the invention is the provision of a practical apparatus for enameling wire requiring little or no applied heat.

In one embodiment of the invention, a wire is passed through a composition composed of a substantially non-combustible insulating material combined with suitable volatile, combustible substances, whereby a coating adheres to the wire. As the wire emerges from the composition it is passed through a heated substantially oxygen-free zone where some of the substances are vaporized to render them more inflammable. It next passes through a zone where air is admitted and the vapors are ignited, whereupon the insulating material is baked or hardened upon the wire by the heat of combustion of the combustible substances in the coating composition.

Further objects and features of the invention will be apparent from the following detailed description and the accompanying drawings illustrating one embodiment of the invention, in which, Fig. 1 is a vertical sectional view of an insulating device taken substantially on the line 1—1 of Fig. 2, and Fig. 2 is a transverse vertical sectional view of the insulating apparatus.

The accompanying drawings, in which like numerals designate similar parts throughout the several views, illustrates an apparatus for insulating wires of relatively great length, which embodies features of the invention. In this embodiment of the invention there is provided a sheave 10 around which a wire 11 which is to be insulated passes from a supply reel (not shown) to a large cylidrical grooved pulley 12 fixedly mounted upon a shaft 13 which is driven in any suitable manner. The wire 11 passes over and around the pulley 12 and then downwardly into an insulating composition 15 contained in a vessel 16 in which is mounted a cylindrical grooved pulley 17 upon a shaft 18 which is secured in bearings 19—19 provided in the walls of the vessel 16. Extending into the composition contained in the vessel 16 is a tube 20 in the lower end of which is mounted a roller 21 for removing any excess composition from the wire. The tube 20 extends vertically through a heating chamber 23 in which is mounted a heating device of any suitable sort, such as a U-shaped gas burner 24, and is provided in that portion which extends above the heating chamber 23 with a plurality of openings 26—26. The portion of the tube 20 which is provided with the openings 26—26 is surrounded by a chamber 27 having an opening 28 leading to the atmosphere, adjacent which opening is mounted a valve plate 29 for regulating the amount of air which may enter the openings 28 and 26—26.

A combustion chamber 30 is connected to the upper end of the tube 20, which chamber is provided at its lower end with a plurality of holes 32—32. The lower end of the combustion chamber is surrounded by an air chamber 33 similar to chamber 27, and chamber 33 is provided with an opening 34 and a valve plate 35 for regulating the amount of air admitted thereto. Near the upper end of the combustion chamber 30 there is provided a flue pipe 37 for conducting away products of combustion, which pipe is provided with a damper 38 of any suitable type. A small L-shaped gas jet 40 which may be connected in any suitable manner to a gas main (not shown) extends through the chamber 27 and into the bottom of the combustion chamber 30 for the purpose of initially igniting combustible materials entering the chamber through the tube 20. Alternatively, a spark plug and gas engine ignition apparatus, or any suitable igniter known in the art, may be used for this purpose.

The operation of the apparatus is as follows: The wire 11 is passed from a suitable supply spool (not shown) around the sheave 10, over the pulley 12, down and around the pulley 17, over the roll 21, through the tube 20 and the combustion chamber 30, around the pulley 12, again down and around the pulley 17, and through the tube 20 and chamber 30 to the pulley 12. The wire is threaded around pulleys 12, 17 and 21 in this way several times (five times in the embodiment shown), and the last pass is drawn from the pulley 12 to a take-up device of any suitable type (not shown).

The vessel 15 is filled to a level above the lower end of the tube 20 with an insulating composition consisting of a substantially non-combustible insulating material combined with any suitable volatile and combustible solvent or solvents. By the term "solvent", as used above and hereinafter in the specification and annexed claims, is meant any substance which will combine with the insulating material to form a true solution, an emulsion, a suspension or a mixture of any of these states of matter. The gas from the burner 24 is ignited, the supply of gas to the tube 40 is so regulated that only a small jet of flame will extend from the end of the tube and the gas ignited to furnish a pilot light. Or the igniter or spark coil is put into operation for a few moments if such other ignition means is used instead of the pilot light.

The mechanisms driving the take-up device and the pulley 12 are started, when the wire 11 will be drawn through the insulating composition 15 and become coated thereby. A strand of the coated wire passes vertically from the composition directly into the tube 20 without free access to the air and over the roller 21, where, by the wiping action of the roller, any excess of insulating composition is removed. The coated strand then passes upwardly through the tube 20 which is heated by the burner 24 and in which some of the volatile, combustible substances present in the coating on the wire are vaporized. Since the lower end of the tube 20 dips into the coating composition and the vapors produced in the heated zone of the tube 20 are burned above, this portion of the tube is substantially free of oxygen. The wire next travels past the openings 26 in the upper portion of the tube 20 where a supply of air sufficient to burn substantially all of the solvents in the coating is admitted and mixes with the vapors produced below. In the lower end of the combustion chamber 30 the mixture of vapors and air is ignited by means of the pilot flame of jet 40 whereupon the solvents upon that portion of the wire passing, at that instant, through the lower portion of the combustion chamber become ignited, additional air being admitted into the combustion chamber through the openings 34 and 32—32. The damper 38 and the valve plates 29 and 35 are adjusted so that the flame produced by the combustion of the solvents is of a height which gives a satisfactory product. In the lower portion of the combustion chamber 30 substantially all of the solvents in the coating upon the wire are burned and sufficient heat is generated at this point to bake the insulating material firmly upon the wire. The wire now coated with a hard insulating substance passes upwardly through the upper portion of the combustion chamber and through the hot products of combustion therein, which are generated in the lower portion of the combustion chamber, whereby any remaining solvents in the coating are driven off and the insulating material is completely hardened upon the wire. The wire is then passed over the pulley 12 and again through the above outlined steps to add another coating of insulating material upon the wire and the wire is repassed through the apparatus until the insulating coating thereon has assumed a thickness sufficient for the use to which the wire is to be put.

One of the outstanding features of the invention is the elimination of apparatus for treating waste vapors, such as is usually necessary in apparatus for treating cores in strand form. In most apparatus of this sort, wires are coated with an insulating composition and are passed through externally heated ovens wherein the volatile portions of the composition are vaporized. It then becomes necessary to remove and treat these vapors in order to eliminate fire and health hazards, which operations require additional apparatus for their accomplishment. By utilizing the solvents in insulating compositions to furnish the heat necessary to harden portions of the composition upon conductors, this invention not only effects a large saving in fuel, but also eliminates fire and health hazards without any additional apparatus.

It will be seen from the above description that various characteristics of insulation may be obtained upon the wire by varying the conditions within the apparatus, which may be effected by changing the viscosity of or the per cent of solvent in the insulating solution, by changing the temperature within the heating chamber 23, by regulating the supply of air admitted to the chambers 27 and 33, by changing the position of the damper 38, and by varying the speed with which the wire is drawn through the apparatus. It is, of course, to be understood that the above embodiment is illustrative only and that various changes in the shape and proportions of the parts may be made without departing from the scope of the invention as defined in the appended claims.

What is claimed is:

1. An apparatus for treating a core in strand form, which comprises means for coating the core with a substantially non-volatile coating material combined with a volatile combustible substance, a combustion chamber, and means within the combustion chamber for igniting the volatile substance of the coating to cause it to burn and thereby furnish substantially all of the heat necessary to consolidate the coating material upon the core.

2. An apparatus for treating a core in strand form, which comprises means for coating the core with a composition composed of an insulator dissolved in a volatile, combustible solvent, means for vaporizing a portion of the solvent from the coating, a combustion chamber, and means within the combustion chamber for igniting the solvent in the coating to cause it to burn and thereby furnish substantially all of the heat necessary to harden the insulator upon the core.

3. An apparatus for insulating electrical conductors, which comprises means for conveying a conductor through a composition composed of insulating material combined with a combustible solvent, a vertical tube, one end of which dips into the solution, means for drawing the conductor from the composition directly into and through the tube, and means within the tube to ignite the solvent in the resulting coating on the conductor to supply heat to harden the insulating material upon the conductor.

4. An apparatus for insulating electric wires, which comprises means for conveying a wire through a composition composed of insulating material combined with a volatile, combustible solvent, a vertical tube, one end of which dips into the composition, means for drawing the wire from the composition directly into and through the tube, means for heating the tube to vaporize a portion of the solvent from the coating on the wire, and means within the tube to ignite the solvent in the coating to supply heat to bake the insulating material upon the wire.

5. An apparatus for insulating electrical conductors, which comprises means for coating a conductor with a composition composed of insulating material combined with volatile, combustible solvents, a tube, means for drawing the wire through the tube, heating means adjacent the tube for vaporizing a portion of the solvents in the coating, and means for igniting the solvents in the coating to supply heat to harden the insulating material upon the wire.

6. An apparatus for insulating electric wires, which comprises means for conveying a wire through a composition composed of insulating material combined with a combustible solvent, a tube, one end of which dips into the composition, adjustable means for admitting air into the tube, means for drawing the wire from the composition directly into and through the tube, and means within the tube for igniting the solvents in the resulting coating on the wire to furnish the sole supply of heat for hardening the insulating material upon the wire.

7. An apparatus for insulating electric wires, which comprises means for conveying a wire through an insulating material combined with volatile, combustible solvents, a vertical heating tube provided at its upper end with a plurality of openings and the lower end of which dips into the insulating composition, a heating chamber provided with heating means surrounding the lower portion of the tube and positioned below the openings therein, a combustion chamber connected to the heating tube and provided at its lower end with a plurality of openings, means for conveying the wire from the composition directly into and through the heating tube and through the combustion chamber, and means within the combustion chamber for igniting the solvents in the coating upon the wire to supply heat for hardening the insulating material upon the wire.

8. An apparatus for insulating electrical conductors, which comprises means for coating a conductor with a composition composed of insulating material dissolved in volatile, combustible solvents, a heating tube, a heating chamber surrounding one end of the tube, a combustion chamber connected to the tube, means for conveying the coated wire through the tube and chamber, and means within the combustion chamber for igniting the combustible material in the coating, the wire conveying means causing the wire to travel in the direction of the flame in the combustion chamber.

9. An apparatus for insulating electric wires, which comprises means for conveying a wire through a composition composed of an insulating material combined with volatile, combustile solvents, a vertical heating tube provided at its upper end with a plurality of small holes and the lower end of which dips into the composition, a vertical heating chamber provided with heating means surrounding the lower portion of the tube and positioned below the openings therein, a combustion chamber provided at its lower end with a plurality of openings, a laterally extending gas outlet tube provided with a damper connected to the upper portion of the chamber, means for drawing the wire from the composition directly into and through the heating tube and through the combustion chamber, means within the chamber for igniting the solvents in the coating on the wire to supply heat for hardening the insulating material upon the wire, and means for repassing the wire through the apparatus to apply a second coating thereon.

10. In a coating apparatus, a container for coating material, a tube having its lower end positioned to normally extend into the coating material in said container and extending upwardly therefrom, heating means adjacent a portion of the tube above the coating material, said tube being provided with air inlet openings above the heating means, and a combustion chamber connected to the upper end of the tube.

11. In a coating apparatus, a container for coating material, a tub extending upwardly from the container and having its lower end projecting into the container, a combustion chamber communicating with the upper end of the tube, and igniting means in the combustion chamber.

12. In a coating apparatus, means for continuously coating an article, means forming a substantially oxygen-free zone, means forming a heating zone, means forming an air inlet zone, means forming a combustion zone, and means for moving the article successively through said zones.

13. In a coating apparatus, means for applying a liquid coating to an article, means forming a substantially oxygen-free zone, means forming a heating zone, means forming an air-inlet zone, means forming a combustion zone, all of said zones communicating with each other in the order named, and means for moving the article successively through said zones.

14. In a material treating apparatus, means for coating a core with a solution of a substantially non-volatile material in a more combustible material, a combined heating and combustion chamber associated therewith for burning the more combustible material to consolidate the material on the core, and means for heating the chamber to vaporize the combustible material and render it more inflammable.

15. In a material treating apparatus, means for coating a core in strand form with a solution of an insulating material combined with a volatile, combustible solvent, a combined heating and combustion chamber associated therewith for burning the solvent to harden the insulating material upon the core, means for conveying the coated core through the chamber, and means for heating the chamber to vaporize the combustible material and render it more inflammable.

16. In a strand coating apparatus, means containing a body of coating material combined with a volatile combustible solvent, a tubular member having one of its ends immersed in the coating material and extending upwardly therefrom to form a combustion chamber, said tubular member being provided with inlet and outlet ports for the passage of a combustion supporting medium, and means for passing a strand through the coating material and combustion chamber.

17. In a strand coating apparatus, means containing a body of coating material combined with a volatile combustible solvent, a tubular member forming a combustion chamber and having one of its ends immersed in the coating material, said tubular member being provided with inlet and outlet ports for the passage of a combustion supporting medium, means for passing a strand through the coating material and combustion chamber, and heating means associated with the tubular member between the body of coating material and the inlet and outlet ports.

18. In a strand coating apparatus, means containing a body of coating material combined with a volatile combustible solvent, an upwardly extending tubular member forming a combustion chamber and having its lower end closed against the entrance of air, said tubular member being provided with inlet and outlet ports for the passage of air, means for passing a strand through the coating material and tubular member, and heating means for the tubular member positioned below the inlet and outlet ports.

19. In a strand coating apparatus, means containing a body of coating material combined with a volatile combustible solvent, an upwardly extending tubular member positioned above the coating material and having its lower end immersed therein, heating means associated with the lower portion of the tubular member to form therewith a vaporizing zone, said tubular member being provided with an inlet port above the vaporizing zone to constitute a combustion chamber, the portion of the tubular member above the combustion zone being enlarged and provided with an exhaust to constitute a baking zone through which the products of combustion may pass, and means for passing a strand through the coating material and upwardly through the tubular member.

20. An apparatus for treating a core in strand form, comprising means for coating the core with a substantially nonvolatile coating material combined with a volatile combustible solvent, a tube, means for drawing the coated wire through the tube, a heating chamber surrounding a portion of the tube for vaporizing a portion of the solvents in the coating, an air chamber surrounding a portion of the tube above the heating chamber, communicating with atmosphere through an adjustable opening and communicating with the tube through apertures in the walls thereof, and means for igniting the solvents in the coating to supply heat to harden the insulating material upon the core.

In witness whereof, I hereunto subscribe my name this 17th day of August, A. D., 1928.

HENRY MARTIN LARSEN.